United States Patent
Genta et al.

(10) Patent No.: US 9,994,996 B2
(45) Date of Patent: Jun. 12, 2018

(54) RAW-MATERIAL SUPPLY DEVICE AND BIOMASS SEPARATION DEVICE

(71) Applicant: MITSUBISHI HITACHI POWER SYSTEMS ENVIRONMENTAL SOLUTIONS, LTD., Yokohama-shi, Kanagawa (JP)

(72) Inventors: Minoru Genta, Kobe (JP); Seiichi Terakura, Kobe (JP); Ryosuke Uehara, Kobe (JP); Seiji Kobayashi, Kobe (JP)

(73) Assignee: MITSUBISHI HITACHI POWER SYSTEMS ENVIRONMENTAL SOLUTIONS, LTD., Kanagawa (JP)

( * ) Notice: Subject to any disclaimer, the term of this patent is extended or adjusted under 35 U.S.C. 154(b) by 363 days.

(21) Appl. No.: 14/764,585

(22) PCT Filed: Feb. 28, 2013

(86) PCT No.: PCT/JP2013/055501
§ 371 (c)(1),
(2) Date: Jul. 30, 2015

(87) PCT Pub. No.: WO2014/132410
PCT Pub. Date: Sep. 4, 2014

(65) Prior Publication Data
US 2015/0368862 A1  Dec. 24, 2015

(51) Int. Cl.
*B09B 3/00* (2006.01)
*B30B 5/00* (2006.01)
(Continued)

(52) U.S. Cl.
CPC ........... *D21C 7/06* (2013.01); *B09B 3/00* (2013.01); *B30B 5/00* (2013.01); *B30B 9/12* (2013.01);
(Continued)

(58) Field of Classification Search
CPC .... B09B 3/00; B30B 5/00; B30B 9/12; B30B 9/18; B30B 9/121; B30B 9/125;
(Continued)

(56) References Cited

U.S. PATENT DOCUMENTS

| 2010/0285574 A1 | 11/2010 | Genta et al. |
| 2011/0300617 A1* | 12/2011 | Genta ..................... C12N 1/22 435/286.1 |
| 2013/0143289 A1* | 6/2013 | Van Der Meulen ... C12M 21/12 435/145 |

FOREIGN PATENT DOCUMENTS

| JP | 62-208268 A | 9/1987 |
| JP | 1-94495 U | 6/1989 |

(Continued)

OTHER PUBLICATIONS

The Translation of the Written Opinion for PCT/JP2013/055501, dated Aug. 2013.*

(Continued)

*Primary Examiner* — David A Reifsnyder
(74) *Attorney, Agent, or Firm* — Hauptman Ham, LLP

(57) ABSTRACT

A raw-material supply device for supplying a biomass raw material under pressure, wherein the device is provided with: a screw body, provided inside a screw feeder and adapted for compressing, rotating, and transporting the powdered biomass raw material using a motor from a normal-pressure feed section for the fed biomass raw material to a high-pressure discharge section; and a pressing plug provided on the tip section side of the screw body, the pressing plug having a plug tip for maintaining a high-temperature/high-pressure field against the discharge force of compressed consolidated biomass. The interior of the screw feeder comprises a raw-material feed region for feeding the biomass raw material in the raw-material transport direction, a raw-material compression region for com- (Continued)

pressing the biomass raw material, a raw-material consolidation region for consolidating the biomass raw material in the form of a cork, and a material seal section for maintaining the high-pressure field using the consolidated biomass.

7 Claims, 5 Drawing Sheets

(51) Int. Cl.
| | |
|---|---|
| B30B 9/12 | (2006.01) |
| B30B 9/18 | (2006.01) |
| D21B 1/02 | (2006.01) |
| D21C 7/06 | (2006.01) |
| D21C 11/00 | (2006.01) |

(52) U.S. Cl.
CPC ............. B30B 9/121 (2013.01); B30B 9/125 (2013.01); B30B 9/127 (2013.01); B30B 9/18 (2013.01); D21B 1/021 (2013.01); D21C 11/0007 (2013.01)

(58) Field of Classification Search
CPC .......... B30B 9/127; D21B 1/021; D21C 7/06; D21C 11/007
See application file for complete search history.

(56) References Cited

FOREIGN PATENT DOCUMENTS

| JP | 7-45599 Y2 | 10/1995 |
|---|---|---|
| JP | 2003-48627 A | 2/2003 |
| JP | 2009-183805 A | 8/2009 |
| JP | 2011-245410 A | 12/2011 |
| WO | 2011/111189 A1 | 9/2011 |

OTHER PUBLICATIONS

Written Opinion dated Aug. 6, 2013, corresponding to International patent application No. PCT/JP2013/055501.
Office Action in JP Application No. 2015-502671, dated Jun. 28, 2016.
Decision to Grant a Patent in JP Application No. 2015-502671, dated Nov. 1, 2016.
Notice of Allowance in CA Application No. 2899688, dated Jan. 26, 2017.
International Search Report dated Aug. 6, 2013 in International Application No. PCT/JP2013/055501.
Notice of Acceptance in AU Application No. 2013380114, dated Jun. 8, 2016.

* cited by examiner

RAW-MATERIAL SUPPLY DEVICE AND BIOMASS SEPARATION DEVICE

RELATED APPLICATIONS

The present application is a National Phase entry of International Application No. PCT/JP2013/055501, filed Feb. 28, 2013.

TECHNICAL FIELD

The present invention relates to a raw-material supply device that supplies, for example, biomass raw material, and a biomass decomposition device.

BACKGROUND ART

In a process of converting, for example, cellulose-based biomass to bioethanol or the like by fermenting saccharides obtained by operations such as pretreatment and enzymatic saccharification, methods in which pretreatment is performed under high-temperature and high-pressure conditions have been considered. Implementing such pretreatment requires a means that stably and continuously feeds biomass, which is a solid with low bulk density (for example, 0.05 kg/L), into a reaction device that is under high temperature and high pressure (for example, not less than 1.0 MPa).

As that means, it has been proposed that, for example, a slurry pump, a piston pump, a screw feeder, or the like be used (Patent Document 1).

CITATION LIST

Patent Literature

Patent Document 1: Japanese Unexamined Patent Application Publication No. 2009-183805A

SUMMARY OF INVENTION

Technical Problem

However, when a slurry pump is used, there is the problem that a large amount of water must be added to make the biomass transportable, and therefore a lot of energy (power and heat) is consumed, which is undesirable.

Additionally, when a piston pump is used, since feed is performed by the insertion and extraction of a piston, there is the problem that it results in intermittent operation, and continuous supply capability is reduced.

Furthermore, when a screw feeder is used, although biomass can be fed while maintaining a high pressure up to approximately 1.0 MPa using the raw material by running a supply device that currently exists in the paper manufacturing industry, conventional raw-material supply devices have problems supplying biomass while maintaining higher pressure of not less than 1 MPa using the material.

Thus, there is a desire for a raw-material supply device that supplies biomass while compressing the biomass raw material of low bulk density and maintaining a pressure of not less than 1.0 MPa using the raw material.

In light of the above problems, the problem of the present invention is to provide a raw-material supply device that supplies biomass while maintaining a high pressure of not less than 1.0 MPa using the raw material, and a biomass decomposition device.

Solution to Problem

A first aspect of the present invention for solving the above problem is a raw-material supply device for supplying a powder raw material under from normal pressure to increased pressure, wherein the device is provided with: a screw body that is provided inside a screw feeder and compresses, rotates, and transports a powder raw material using a drive means from a normal-pressure feed section for the fed powder raw material to a high-pressure discharge section; and a pressing means provided on the tip section side of the screw body, the pressing means maintaining a consolidated body of raw material against the discharge force of compressed consolidated raw material. The interior of the screw feeder comprises a raw-material feed region for feeding the powder raw material in a raw-material transport direction using a screw means, a raw-material compression region for compressing the powder raw material, a raw-material consolidation region for consolidating the powder raw material in a form of a cork, and a material seal section for maintaining a high-pressure field using a consolidated biomass.

A second aspect is the raw-material supply device according to the first aspect, wherein the density of the raw material of the raw-material feed region is from 0.01 to 0.3 kg-dry/L, the density of the raw material gradually increases in a transport direction in the raw material compression region, the density of the raw material traversing a terminal section of the raw-material compression region is from 0.04 to 1.2 kg-dry/L, and the density of the material seal section using raw material in the raw-material consolidation region is maintained from 0.2 to 1.2 kg-dry/L.

A third aspect is the raw-material supply device according to the first or second aspect, wherein, in the material seal section, the biomass raw material is compressed to from 0.2 to 1.2 kg-dry/L.

A fourth aspect is the raw-material supply device according to any one of the first to third aspects, wherein the high-pressure field is not less than 1.0 MPa.

A fifth aspect is the raw-material supply device according to any one of the first to fourth aspects, wherein the powder raw material is a biomass raw material.

A sixth aspect is a biomass decomposition device for decomposing biomass raw material having cellulose, hemicellulose, and lignin, comprising: a hydrothermal decomposition section that transports biomass raw material supplied by the biomass supply device of any one of the first to fourth aspects inside a main section from any one side to another by a transport screw, and supplies pressurized hot water, the pressurized hot water being treatment water, to an interior of the main section from another side that differs from the supply location of the biomass raw material, and performs hydrothermal decomposition while putting the biomass raw material and the pressurized hot water into opposing contact, and transfers a hydrothermal decomposition component into a hydrothermal discharge liquid, the hydrothermal discharge liquid being pressurized hot water that is discharged, and separates a lignin component and a hemicellulose component from the biomass raw material; and a biomass discharge section that discharges a biomass solid component from the other side of the main section.

Advantageous Effect of Invention

According to the present invention, biomass can be stably and continuously supplied while high pressure of not less than 1.0 MPa is maintained because the interior of the screw feeder comprises a raw-material feed region for feeding the powder raw material in the raw-material transport direction using a screw means, a raw-material compression region for compressing the powder raw material, a raw-material consolidation region for consolidating the powder raw material in the form of a cork, and a material seal section for maintaining a high-pressure field using the consolidated biomass.

BRIEF DESCRIPTION OF DRAWINGS

FIG. 2-1 is a schematic view of the appearance of a plug tip according to an embodiment.

FIG. 2-2 is a schematic view of the appearance of a plug tip according to an embodiment.

FIG. 2-3 is a schematic view of the appearance of a plug tip according to an embodiment.

FIG. 3 is a schematic configuration diagram illustrating a screw pertaining to an embodiment.

DESCRIPTION OF EMBODIMENTS

The following is a detailed description of a preferred embodiment with reference to the attached drawings. Note that the invention is not limited by the embodiment, and when a plurality of embodiments are present, the invention is intended to include a configuration combining these embodiments.

Examples

Figure 1:
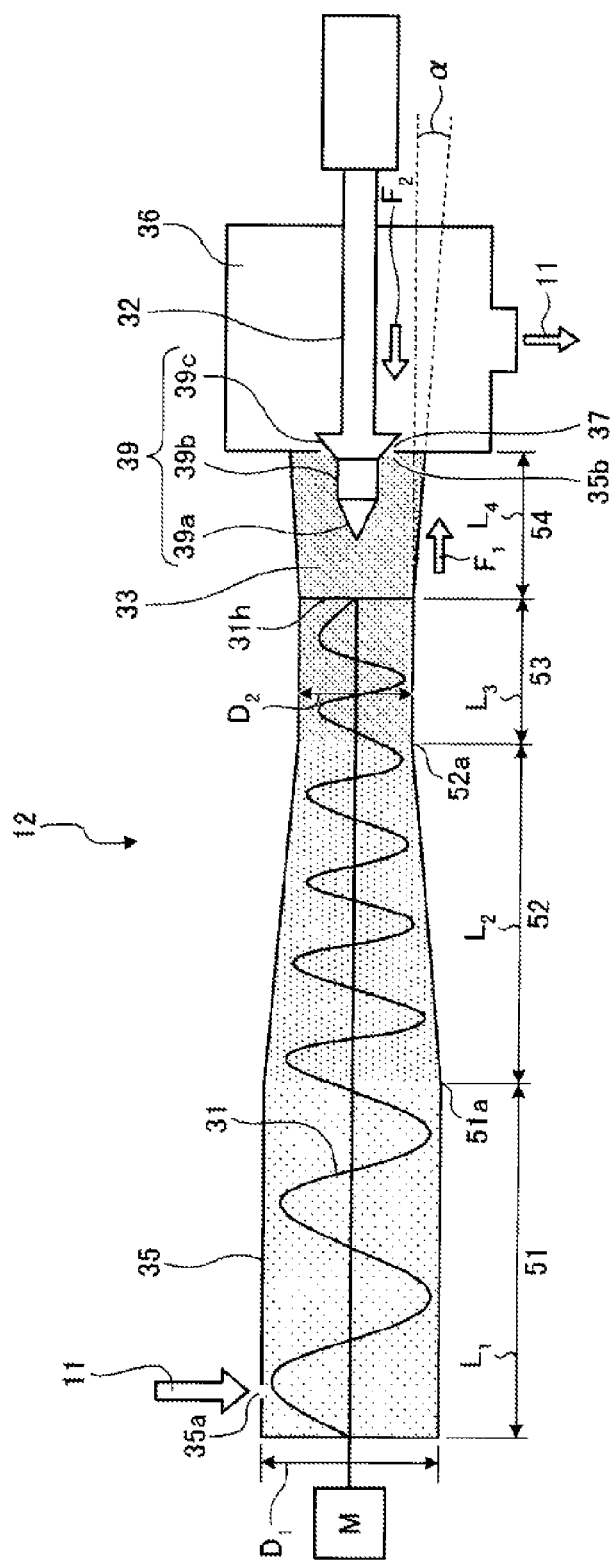
FIG. 1 is a schematic view of a biomass supply device according to an embodiment.

FIG. 1 is a schematic view of a biomass supply device according to an embodiment.

Figure 5:
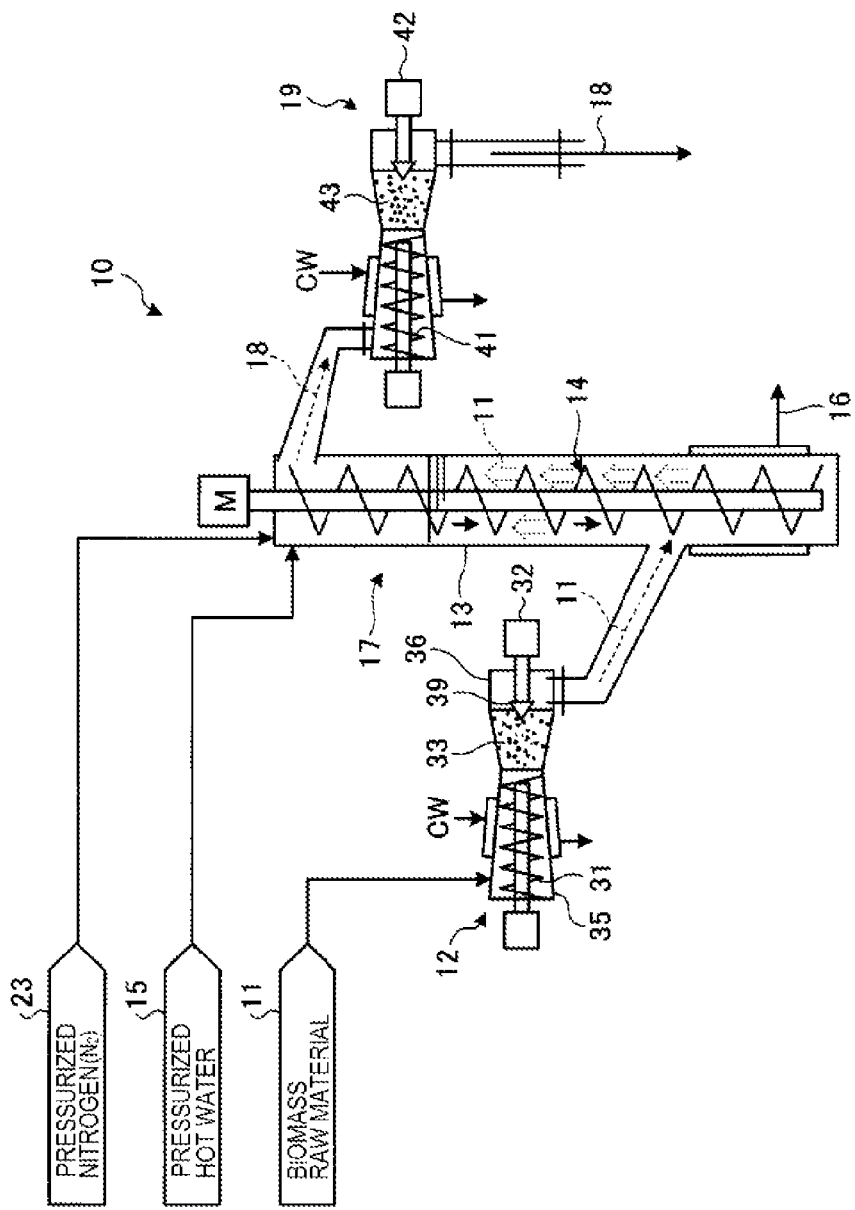
FIG. 5 is a schematic view of a biomass hydrothermal decomposition device comprising the biomass supply device of this embodiment.

FIG. 5 is a schematic diagram of a biomass hydrothermal decomposition device comprising the biomass supply device of this embodiment.

The biomass decomposition device according to the present invention will be described in reference to the drawings.

As illustrated in FIG. 5, a biomass hydrothermal decomposition device 10 according to this embodiment is a biomass decomposition device for decomposing biomass raw material 11 having cellulose, hemicellulose, and lignin, the biomass hydrothermal decomposition device comprising: a hydrothermal decomposition section 17, which transports the biomass raw material 11 supplied by a biomass supply device 12 inside a main section 13 from any one side (the bottom in this embodiment) to another (the top in this embodiment) by a transport screw 14, and supplies pressurized hot water 15, which is treatment water, to the interior of the main section 13 from another side that differs from the supply location of the biomass raw material 11, and performs hydrothermal decomposition while putting the biomass raw material 11 and the pressurized hot water 15 into opposing contact, and transfers a hydrothermal decomposition component into a hydrothermal discharge liquid 16, which is the pressurized hot water that is discharged, and separates a lignin component and a hemicellulose component from the biomass raw material 11; and a biomass discharge section 19, which discharges a biomass solid component 18 from the other side (the top in this embodiment) of the main section 13.

Here, in FIG. 5, reference numeral 12 denotes a biomass supply section, M denotes a motor that drives a transport screw 14, and 23 denotes pressurized nitrogen that pressurizes the interior of the main section 13.

Furthermore, in this embodiment, the biomass raw material 11 is supplied from the bottom end side, but the present invention is not limited thereto, and may be configured in the reverse manner such that it is supplied from the top end side, in which case the pressurized hot water 15 is supplied from the bottom end side.

Note that a biomass supply device 12 that supplies under from normal pressure to increased pressure will be described later.

Furthermore, the hydrothermal decomposition section 17 is installed vertically in this embodiment as illustrated in FIG. 5, but the present invention is not limited thereto, and an inclined hydrothermal decomposition device may be used. Furthermore, a horizontal hydrothermal decomposition reaction device may also be used.

Here, an inclined or vertical hydrothermal decomposition device is preferable because gas produced in the hydrothermal decomposition reaction and gas carried into the raw material and the like can be quickly discharged from above. Furthermore, since the decomposition products are extracted by the pressurized hot water 15, the concentration of extracted products increases from the top toward the bottom, which is preferable from the perspective of extraction efficiency.

By providing a transport screw: 1) transport of solid components with solid-liquid counterflow is possible, 2) solid-liquid separation is possible in the main section, and 3) mixing of the solid surface and the pressurized hot water in the solid progresses and the reaction is accelerated inside the main section.

Here, the biomass supplied to the hydrothermal decomposition section 17 refers to accumulation of organisms or organic matter derived from organisms incorporated in the substance circulation system of the global biosphere (see JIS K 3600 1258) without particular limitation, but in the present invention, the use of wood biomass such as broad-leaf trees, lignocellulose resources such as herbaceous biomass, agricultural waste, food waste, and the like is particularly preferred.

Furthermore, the biomass raw material 11 is not particularly limited in particle size, but it is preferably pulverized to not greater than 5 mm.

In this embodiment, the biomass may also be treated using, for example, a pulverizing device as a raw material adjustment device before supplying the biomass. Furthermore, it may also be cleaned by a cleaning device.

Note that when hull is used as the biomass raw material 11, it may be supplied to the hydrothermal decomposition section 17 as-is without being pulverized.

Furthermore, the reaction temperature in the hydrothermal decomposition section 17 is preferably in the range of 180 to 240° C. It is more preferably from 200 to 230° C.

This is because at low temperatures below 180° C., the hydrothermal decomposition rate is low and a long decomposition time is required, leading to an increase in size of the device, which is undesirable. On the other hand, at temperatures exceeding 240° C., the decomposition rate becomes excessively high, and transfer of the cellulose component from a solid to the liquid side increases and excessive decomposition of hemicellulose-based saccharides is promoted, which is undesirable.

Additionally, the hemicellulose component starts to decompose near approximately 140° C., cellulose starts to decompose near approximately 230° C., and the lignin component starts to decompose near approximately 140° C., but the range of 180 to 240° C. is preferred because cellulose remains on the solid component side while the hemicellulose component and lignin component have sufficient decomposition rates.

Furthermore, the reaction pressure is preferably from 0.1 to 0.5 MPa higher than the saturation vapor pressure of water at each temperature, which results in the interior of the main section being in a state of pressurized hot water.

The reaction time is not greater than 20 minutes, and preferably from 3 to 10 minutes. This is because when the reaction is carried out for a long time, the proportion of excessively decomposed matter increases, which is undesirable.

Here, in the present invention, the flow of the pressurized hot water 15 and the biomass raw material 11 in the main part of the hydrothermal decomposition section is preferably so-called counterflow, wherein the biomass raw material 11 and the pressurized hot water 15 are in opposing contact, so that they contact, are agitated, and flow.

When in opposing contact, when the solid biomass raw material 11 is decomposed by the pressurized hot water 15, the decomposition product thereof is dissolved and transferred to the pressurized hot water 15 side.

Furthermore, the ratio of solid and liquid is preferably such that the liquid component is as small as possible, because the quantity of heat for hydrothermal decomposition and recovered water can be reduced.

Here, the weight ratio of the supplied biomass raw material and pressurized hot water varies depending on device configuration, but, for example, from 1:1 to 1:10 is preferred, and from 1:1 to 1:5 is more preferred.

According to this embodiment, in a slurry circulating-style reaction device such that the biomass raw material 11 and water are premixed and supplied to the main section 13, a fairly large amount of water relative to the solid (from 10 to 20 times by weight ratio) must be added to provide the slurry with fluidity, but since the biomass raw material 11 and the pressurized hot water 15, which removes the lignin component and the hemicellulose component in the biomass, are supplied to the hydrothermal decomposition section 17 by separate systems, the weight ratio of liquid to solid can be reduced, which contributes to improvement in the economy of the device.

Note that in the present invention, because a gas portion is present inside the main section, pressurized nitrogen ($N_2$) 23 is supplied inside.

Furthermore, the biomass raw material 11 in the hydrothermal decomposition section can be heated by direct heat exchange by putting it in contact with the pressurized hot water 15 in the main section. Note that, if necessary, it may also be heated using steam or the like from outside the system.

Here, the biomass supply device 12 employs a screw-style extrusion mechanism having a material seal mechanism using the biomass itself, which supplies the solid biomass raw material 11 from normal pressure to increased pressure.

Specifically, due to having an extrusion mechanism consisting of a screw body 31 and a pressing plug 32, the biomass raw material 11 supplied to the interior is compressed to form a consolidated biomass (biomass plug) 33, and this consolidated biomass 33 itself performs material sealing, which blocks the pressure inside the hydrothermal decomposition device. Being gradually pushed by the screw body 31, the biomass is gradually broke up from the tip section of the pressing plug 32, and the biomass raw material 11 is reliably supplied into the main section 13.

Furthermore, the structure of the biomass discharge section 19 is similar to that of the biomass supply device 12. Due to having an extrusion mechanism including a screw body 41 and a pressing plug 42, the biomass solid component 18 that was reacted in the hydrothermal decomposition device is compressed to form a biomass plug 43, and this biomass plug 43 itself performs material sealing, which blocks the pressure inside the hydrothermal decomposition device. Also, it allows the biomass solid component 18, which transferred the lignin component and the hemicellulose component to the hydrothermal discharge liquid 16, to be discharged under from increased pressure to normal pressure. At that time, the remaining water component is dehydrated from the biomass plug 43.

Since this dehydration liquid contains pressurized hot water-soluble components (lignin component and hemicellulose component), it is fed to the hydrothermal discharge liquid 16 and separately treated together with the hydrothermal discharge liquid 16.

Furthermore, low-molecular volatile enzymatic saccharification-hindering components and/or ethanol fermentation-hindering components can be removed by vaporization in the biomass discharge device 19.

Furthermore, in the present invention, by putting the biomass raw material 11 and the pressurized hot water in opposing contact, readily-solubilizable components are sequentially discharged into the hot water, and also, because a temperature gradient from the biomass feed section to the hot water feed section arises, excessive decomposition of the hemicellulose component is eliminated, and as a result, the five-carbon saccharide component can be efficiently recovered.

Additionally, putting them into opposing contact is preferable from the perspective of system efficiency and because heat can be recovered.

Here, the biomass supply device 12 will be described in detail.

The biomass supply device 12 is a raw-material supply device for supplying a biomass raw material 11, which is powder raw material, under from normal pressure to a pressure of not less than 1.0 MPa, wherein the device is provided with: a screw body 31 that is provided inside a screw feeder 35 and compresses, rotates, and transports the powdered biomass raw material 11 using a motor M from a normal-pressure feed section 35a for the fed biomass raw material 11 to a high-pressure discharge 35b; and a pressing plug 32 provided on the tip section 31d side of the screw body 31, the pressing plug 32 having a plug tip 39 for maintaining a consolidated body of consolidated biomass (biomass plug) 33 against the discharge force of the consolidated biomass (biomass plug) 33. The interior of the screw feeder 35 comprises a raw-material feed region 51 for feeding the biomass raw material 11 in the raw-material transport direction using the screw body 31, a raw-material compression region 52 for compressing the biomass raw material, a raw-material consolidation region 53 for consolidating the powder raw material in the form of a cork, and a material seal section 54 for maintaining the high-pressure field inside the decomposition device using the consolidated biomass 33.

In the biomass supply device 12 of this embodiment, in order to stably and continuously feed biomass into a reaction device that is under a high-temperature and high-pressure field 36 at a high pressure of not less than 1.0 MPa, a material seal section 54, for maintaining the high-pressure field, and a pressing plug 32, having a plug tip 39 which presses the biomass raw material against the flow of the biomass raw material 11 for forming a material seal section 54, are provided.

In this embodiment, a raw-material feed region 51, which reliably causes the biomass raw material 11 of low bulk density to be taken up in the screw body 31, a raw-material compression region 52, which transports the biomass raw material while compressing it, a raw-material consolidation region 53, for further increasing the pressure on the biomass raw material 11 until the pressure of the high-temperature and high-pressure field 36 can be maintained by the compressed biomass, and a material seal section 54, which causes the consolidated biomass raw material (biomass plug) 33 to reside for a certain length in order to reliably maintain the pressure of the high-temperature and high-pressure field 36 are formed.

Furthermore, the high-temperature and high-pressure field 36 is connected with the main section 13 of the biomass hydrothermal decomposition device 10 illustrated in FIG. 5, and introduces the biomass raw material 33 into the device.

Here, in the raw-material consolidation region 53, the increased pressure decreases when the tip section 31*d* of the screw body 31 wears, and thus, in order that the consolidated raw material of the material seal section 54 does not blow back, as a backup region, the raw-material consolidation region 53 has a length not less than the screw length required for demonstrating the theoretical pressurizing capability.

Furthermore, the screw feeder 35 has grooves on the inner surface of a cylinder in order to compress and pressurize the biomass raw material 11. The shape of these grooves may be a spiral shape or a straight shape. The groove depth is determined according to the particle size of the raw material, but may be, for example, from 1 to 10 mm, and more preferably from 2.5 to 5 mm. The installation surface area of the grooves may be from 30 to 80% of the internal peripheral face of a cylinder of the screw feeder 35.

Furthermore, the groove formation region is preferably from the raw-material feed region 51 to the raw-material consolidation region 53. The grooves may be either spiral or parallel to the axis of the screw body 35.

In the raw-material feed region 51, the fed raw material is transported by the screw body 31 to the raw-material compression region 52.

In the raw-material compression region 52, the biomass raw material 11 is compressed. To avoid blockage due to rapid compression, the length $L_2$ of the raw-material compression region 52 is from $2D_1$ to $6D_1$ relative to $D_1$.

In the raw-material compression region 52, the density of the biomass raw material 11 gradually increases along the transport direction, and the density of the biomass raw material 11 that passes through the terminal section 52*a* of the raw-material compression region 52 is from 0.04 to 1.2 kg-dry/L.

In the raw-material consolidation region 53, the raw material consolidated in the raw-material compression region 52 is further compressed to a bulk density capable of sealing, and the density of the biomass raw material 11 is from 0.2 to 1.2 kg-dry/L. The length (lead of screw) $L_3$ of the raw-material consolidation region 53 is from $2D_2$ to $6D_2$ relative to cylinder diameter $D_2$.

The length $L_3$ of the raw-material consolidation region 53 may be not less than $1D_2$, and is preferably from $2D_2$ to $4D_2$ relative to $D_2$.

Furthermore, the depth of the screw grooves (height of screw flight) of the raw-material consolidation region 53 is not greater than $\frac{1}{4} D_2$ relative to diameter $D_2$.

In the material seal section 54, the biomass raw material is compressed to from 0.2 to 1.2 kg-dry/L.

Here, to ensure the seal performance of the material seal section 54, the pressing plug 32 having the plug tip 39 is used as a pressing means such that it presses against the pressure of the consolidated biomass 33.

Here, the pressing force of the pressing plug 32 varies depending on the consolidation state of biomass, but is, for example, from 20 to 50 kgf/cm$^2$.

Furthermore, a pressing means such as, for example, an oil hydraulic cylinder, pneumatic cylinder, or water hydraulic cylinder may be used as the pressing plug 32.

To stably break up the consolidated biomass 33 from the material seal section 54, the tip of the plug tip 39 of the pressing plug 32 has a cone shape.

It also has a cone shape in order to break the consolidated biomass 33 into a donut shape from the excision section 37.

Figures 1, 2:
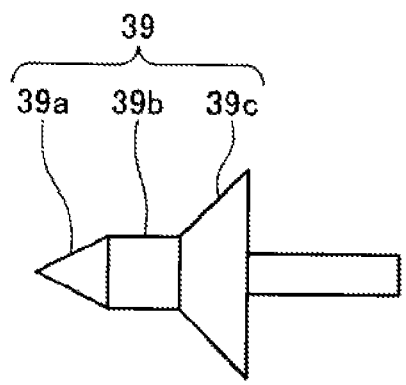
Figure 2:
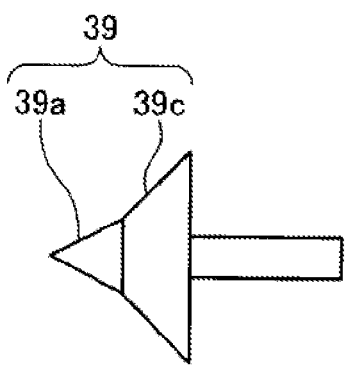
Figures 2, 3:
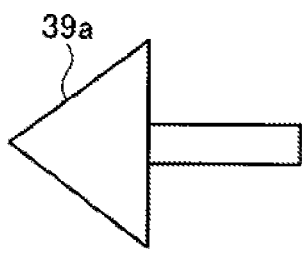
Figure 3:
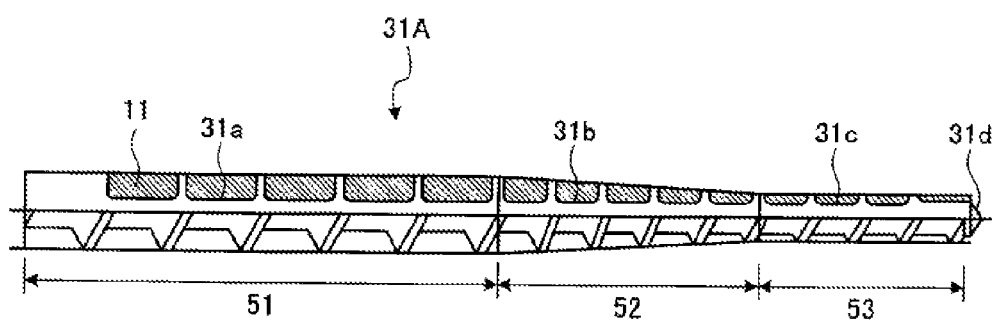

Plug shapes are illustrated in FIGS. 2-1 to 2-3.

In the plug tip 39 of FIG. 2-1, the tip side consists of a three-stage shape having a cone section 39*a*, a column section 39*b*, and a truncated cone section 39*c*, such that the biomass raw material is broke up on the side face of the truncated cone section 39*c*.

In the plug tip 39 of FIG. 2-2, the tip side consists of a two-stage shape having a cone section 39*a* and a truncated cone section 39*c*, such that the biomass raw material is broke up on the side face of the truncated cone section 39*c*.

In the plug tip 39 of FIG. 2-3, the tip side consists of a one-stage shape having only a cone section 39*a*, such that the biomass raw material is broke up on the side face of the cone section 39*a*.

Furthermore, the shape of the material seal section 54 is a straight shape or a tapered shape that widens on the outlet side (angle α from 0 to 5 degrees).

Discharge of the consolidated biomass 33 is improved by using a tapered shape.

As described above, in the biomass supply device 12 according to this embodiment, biomass raw material can be stably and continuously supplied into a high-temperature and high-pressure field 36 while high pressure of not less than 1.0 MPa (further, not less than 2.0 MPa) is maintained by the consolidated biomass, because the interior of the screw feeder 35 comprises a raw-material feed region 51 for feeding the powder raw material in the raw-material transport direction using a screw means, a raw-material compression region 52 for compressing the powder raw material, a raw-material consolidation region 53 for consolidating the powder raw material in the form of a cork, and a material seal section 54 for maintaining a high-pressure field using the compressed consolidated biomass.

Embodiments of the screw body will be described in reference to FIGS. 3 and 4.

The screw body 31A illustrated in FIG. 3 is installed when the outer peripheral surface of the screw feeder 35 has a tapered shape.

In the case of the tapered screw feeder 35 as illustrated in FIG. 3, the channel depth and lead of the screw body 31A change a small amount going toward the tip section 31*d*.

In this embodiment, the first five channels 31*a* of the screw body 31A are the raw-material feed region 51, the next five channels 31*b* are the raw-material compression region 52 for compressing the powder raw material, and the last four channels 31c are the raw-material consolidation region 53 for consolidating the powder raw material in the form of a cork.

Therefore, when a prescribed amount of biomass is fed in the feed section, the volume of the channel becomes small, and as a result, its bulk is consolidated, which assures compression and consolidation of the biomass.

Figure 4:
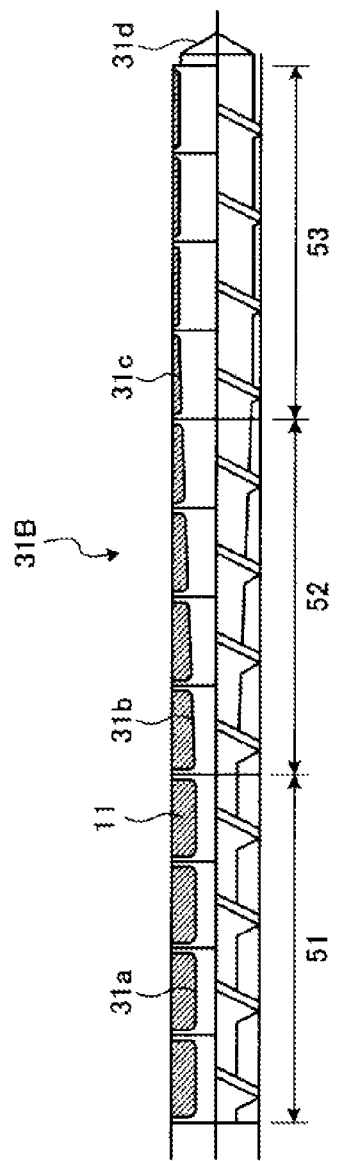
FIG. 4 is a schematic configuration diagram illustrating another screw pertaining to an embodiment.

The screw body 31B illustrated in FIG. 4 is installed in the case where the diameter of the outer peripheral surface of the screw feeder 35 is constant.

In the case of a constant-diameter screw feeder 35 as illustrated in FIG. 4, the lead of the screw body 31A is constant, and the depth of the channels 31b and 31c changes so as to become gradually shallower going toward the tip section 31d.

In this embodiment, the first four channels 31a of the screw body 31B are the raw-material feed region 51, the next four channels 31b are the raw-material compression region 52 for compressing the powder raw material, and the last four channels 31c are the raw-material consolidation region 53 for consolidating the powder raw material in the form of a cork.

Therefore, when a prescribed amount of biomass is fed in the feed section, the volume of the channel becomes small, and as a result, its bulk is consolidated, which assures compression and consolidation of the biomass.

This embodiment was described using biomass raw material of low bulk density as the raw material powder, but the present invention is not limited thereto, and it may also be employed for a raw-material supply device used when supplying powder raw material of low bulk density in a high-pressure field.

REFERENCE SIGNS LIST

10 BIOMASS HYDROTHERMAL DECOMPOSITION DEVICE
11 BIOMASS RAW MATERIAL
12 BIOMASS SUPPLY DEVICE
13 MAIN SECTION
14 SCREW
15 PRESSURIZED HOT WATER
16 HOT WATER DISCHARGE LIQUID
17 HYDROTHERMAL DECOMPOSITION SECTION
18 BIOMASS SOLID COMPONENT
19 BIOMASS DISCHARGE SECTION
31 SCREW BODY
31a to 31c CHANNELS
32 PRESSING PLUG
33 CONSOLIDATED BIOMASS
35 SCREW FEEDER
36 HIGH-TEMPERATURE AND HIGH-PRESSURE FIELD
39 PLUG TIP
51 RAW-MATERIAL FEED REGION
52 RAW-MATERIAL COMPRESSION REGION
53 RAW-MATERIAL CONSOLIDATION REGION
54 MATERIAL SEAL SECTION

The invention claimed is:

1. A raw-material supply device for supplying a powdered raw material under normal pressure to increased pressure, comprising:
   a screw body that is provided inside a screw feeder and compresses, rotates, and transports the powdered raw material using a drive means from a normal-pressure feed section for the fed powdered raw material to a high-pressure discharge section; and
   a pressing means equipped with a plug tip having a truncated cone section or a cone section which is provided on a tip section side of the screw body and maintains a consolidated state of the powdered raw material against a discharge force of the consolidated powdered raw material,
   an interior of the screw feeder comprising a raw-material feed region for feeding the powdered raw material in a transport direction of the powdered raw material using the screw body,
   a raw-material compression region for compressing the powdered raw material,
   a raw-material consolidation region for consolidating the powdered raw material into a corklike plug, and
   a material seal section for maintaining a high-pressure field using the consolidated powdered raw material, wherein
   the material seal section has an excision section on an outlet side of the material seal section to break up the consolidated powdered raw material through a side face of the truncated cone section or the cone section of the plug tip.

2. The raw-material supply device according to claim 1, wherein
   the powdered raw material having a bulk density of from 0.01 to 0.3 kg-dry/L is used,
   the density of the powdered raw material of the raw-material feed region is from 0.01 to 0.3 kg-dry/L, the density of the powdered raw material gradually increases along the transport direction in the raw-material compression region, the density of the powdered raw material passing through a terminal section of the raw-material compression region is from 0.04 to 1.2 kg-dry/L, and the density of the material seal section using the powdered raw material in the raw-material consolidation region is maintained from 0.2 to 1.2 kg-dry/L.

3. The raw-material supply device according to claim 1, wherein,
   in the material seal section, the powdered raw material is compressed to from 0.2 to 1.2 kg-dry/L.

4. The raw-material supply device according to claim 1, wherein
   the high-pressure field is not less than 1.0 MPa.

5. The raw-material supply device according to claim 1, wherein
   the powdered raw material is made from cellulose-based biomass.

6. The raw-material supply device according to claim 1, wherein the excision section is arranged inside of the outlet of the material seal section to break the consolidated powdered raw material into a donut shape therefrom.

7. A biomass decomposition device for decomposing biomass raw material having cellulose, hemicellulose, and lignin, comprising:
   a hydrothermal decomposition section that transports the powdered raw material supplied by the raw-material supply device described in claim 1 inside a main section from any one side to another by a transport screw, supplies pressurized hot water, the pressurized hot water being treatment water, to an interior of the main section from another side that differs from the supply location of the powdered raw material, and performs hydrothermal decomposition while putting the powdered raw material and the pressurized hot water into opposing contact, transfers a hydrothermal decomposition component into a hydrothermal discharge liquid, the hydrothermal discharge liquid being the pressurized hot water that is discharged, and separates a lignin component and a hemicellulose component from the powdered raw material; and a biomass discharge section that discharges a solid component from the other side of the main section.

* * * * *